US005603756A

United States Patent [19]

Suzuki et al.

[11] Patent Number: 5,603,756

[45] Date of Patent: Feb. 18, 1997

[54] INK-JET TEXTILE PRINTING INK, INK-JET PRINTING PROCESS AND INSTRUMENT MAKING USE OF THE SAME, AND PROCESSED ARTICLE OBTAINED

[75] Inventors: Mariko Suzuki, Kawasaki; Masahiro Haruta, Tokyo; Shoji Koike, Yokohama; Koromo Shirota, Inagi; Tomoya Yamamoto, Kawasaki, all of Japan

[73] Assignee: Canon Kabushiki Kaisha, Tokyo, Japan

[21] Appl. No.: 443,633

[22] Filed: May 23, 1995

Related U.S. Application Data

[63] Continuation of Ser. No. 226,331, Apr. 12, 1994, abandoned.

[30] Foreign Application Priority Data

Apr. 14, 1993 [JP] Japan .................................... 5-087238

[51] Int. Cl.$^{6}$ ..................................................... C09D 11/02

[52] U.S. Cl. ...................... 106/22 R; 106/20 D; 442/168

[58] Field of Search ................................ 106/22 R, 22 D, 106/22 H, 22 K, 20 D; 428/289

[56] References Cited

U.S. PATENT DOCUMENTS

| | | | |
|---|---|---|---|
| 4,410,899 | 10/1983 | Haruta et al. | 346/1.1 |
| 4,969,951 | 11/1990 | Koike et al. | 106/22 C |

FOREIGN PATENT DOCUMENTS

| | | |
|---|---|---|
| 0553761 | 8/1993 | European Pat. Off. . |
| 54-059936 | 5/1979 | Japan . |
| 57-174360 | 10/1982 | Japan . |
| 59-199781 | 11/1984 | Japan . |
| 61-231289 | 10/1986 | Japan . |
| 62-283174 | 12/1987 | Japan . |
| 63-168382 | 7/1988 | Japan . |
| 03046589 | 7/1991 | Japan . |
| 2252335 | 8/1992 | United Kingdom . |

OTHER PUBLICATIONS

English translation of Japanese Laid–Open Patent Application No. 57–174360, Sato, et al, Oct. 1982.

English translation of Japanese Laid–Open Patent Application No. 59–199781, Shiwa, et al, Nov. 1994.

*Primary Examiner*—Helene Klemanski

*Attorney, Agent, or Firm*—Fitzpatrick, Cella, Harper & Scinto

[57] ABSTRACT

Disclosed herein is an ink-jet textile printing ink comprising at least a reactive dye and water, wherein the ink contains a hydrolyzate of the reactive dye in an amount of 1% to 50% by weight based on the weight of the reactive dye.

19 Claims, 3 Drawing Sheets

INK-JET TEXTILE PRINTING INK, INK-JET PRINTING PROCESS AND INSTRUMENT MAKING USE OF THE SAME, AND PROCESSED ARTICLE OBTAINED

This application is a continuation of application Ser. No. 08/226,331 filed Apr. 12, 1994, now abandoned.

BACKGROUND OF THE INVENTION

1. Field of the Invention

The present invention relates to an ink-jet printing ink suitable for use in conducting textile printing, in particular, on woven or nonwoven fabrics of cotton, silk or the like, which are dyeable with reactive dyes and composed principally of cellulose fibers and/or polyamide fibers, or mixed woven or nonwoven fabrics composed of these fibers and other fibers, and an ink-jet printing process and an instrument making use of the ink. Further, the present invention relates to processed articles obtained by the ink-jet printing processes.

2. Related Background Art

At present, textile printing is principally conducted by screen printing or roller printing. Both processes are unfit for multi-kind small-quantity production and difficult to quickly cope with the fashion of the day. Therefore, there has recently been a demand for development of an electronic printing system making no use of any plate. In compliance with this demand, many textile printing processes according to ink-jet recording have been proposed. Various fields expect much from such textile printing processes.

Ink-jet textile printing inks are required to have the following performance characteristics:

(1) being able to color to a sufficient color depth after conducting washing;

(2) causing no clogging in an ejection nozzle;

(3) being able to stably color upon fixing treatment;

(4) undergoing little irregular feathering on cloth;

(5) undergoing no changes in physical properties and ejection properties and depositing no solid matter in the course of storage; and (6) undergoing no change in ejection properties even in a long-time ejection durability test, and causing neither disconnection nor deposition of foreign matter on a heating head, in particular, in a case of textile printing by a system making use of thermal energy.

In order to satisfy these performance characteristics required, the following means have heretofore been proposed.

First, in order to cope with the requirement (1), it has been generally conducted to make the concentration of a dye sufficiently high so as to give a satisfactory color depth. This method is an essential means for using ink droplets as minute as 200 pl or less, or conducting textile printing on a cloth high in absorbing power. However, such an ink causes a problem of thickening due to evaporation of water in the ink from an orifice of a nozzle and the problem as to the requirement (2) because of deposition of the dye as solid matter.

It has therefore been conducted to add a polyhydric alcohol such as glycerol to an ink in ink-jet recording on common paper other than textile printing in order to cope with the requirement (2). However, this means is not useful for such an ink as used in textile printing, in which the concentration of a dye contained in the ink exceeds 5%, and hence does not give a satisfactory result except for the case of an extremely specific combination of dye and solvent. Japanese Patent Application Laid-Open Nos. 59-199781 and 57-174360 disclose the use of a hydrolyzate of a reactive dye and a reaction product of a reactive dye with a polyhydric alcohol, respectively, in order to prevent clogging in ink-jet recording other than textile printing. Since these inks do not react with fibers, however, they cannot be used in a field of dyeing.

The requirement mentioned in (3) is a requirement that dyes used in a case where plural colors are overlapped one after another must have similar dyeing properties (reaction rate).

In order to cope with the requirement (4), many proposals have been already made laying stress on the pretreatment of cloth. As means for coping with such a requirement as to inks, may be mentioned, for example, addition of tannin to an ink as disclosed in Japanese Patent Application Laid-Open No. 61-231289 and addition of a carboxyl group-containing polymer to an ink as disclosed in Japanese Patent Application Laid-Open No. 62-283174. However, both means can not avoid the problems of the requirements (1) and (2) arising from ink.

With respect to the requirements (3), (5) and (6), close investigations have not been conducted under the circumstances because an improvement may be made on the basis of the structure of dye or by additives.

In the field of textile printing, there has been a demand for dyeing cloths of different kinds. However, the optimum composition of an ink varies with individual cloths. More specifically, a dye to be used greatly varies in kind and even fixing conditions thereof depending upon the dyeing mechanism between dye and cloth, which is an ionic bonding, a covalent bonding or a simple diffusion of the dye into fibers. In addition, since polyester and cellulosic fibers considerably differ from each other in affinity for water, the design of the whole liquid medium including additives must be devised if printing is conducted with a water-based ink on cloths formed of such fibers. Accordingly, technical problems required of inks vary little by little depending upon cloths to be printed, so that individual designs are required for inks.

As described above, means capable of satisfying one of the above requirements have been able to be found in the prior art. However, there have not yet been known any textile printing ink and ink-jet printing process, which satisfy all the above-mentioned requirements at the same time and solve a series of the problems described above.

SUMMARY OF THE INVENTION

It is therefore an object of the present invention to provide inks and printing processes, which can satisfy, at the same time, a requirement for dyeing that ink should stably provide prints bright and high in color depth, and requirements for ejection performance that ink should have good short-term and long-term stability, its dyeing properties should remain unchanged during storage at room temperature and ink should permit textile printing with high reliability even when the ink is ejected by using thermal energy, and instruments making use of such an ink.

Such an object can be achieved by the present invention described below.

According to the present invention, there is thus provided an ink-jet textile printing ink comprising at least a reactive dye and water, wherein the ink contains a hydrolyzate of the reactive dye in an amount of 1% to 50% by weight based on the weight of the reactive dye.

According to the present invention, there is also provided an ink-jet textile printing ink comprising at least a reactive dye, a polyhydric alcohol and water, wherein the ink contains a reaction product of the reactive dye with the polyhydric alcohol in an amount of 1% to 50% by weight based on the weight of the reactive dye.

According to the present invention, there is further provided an ink-jet printing process comprising applying an ink to a cloth in accordance with an ink-jet system, subjecting the cloth to a reactively fixing treatment and then washing the cloth thus treated to remove an unreacted dye, wherein the ink comprises at least a reactive dye and water and contains a hydrolyzate of the reactive dye in an amount of 1% to 50% by weight based on the weight of the reactive dye, and the cloth comprises cellulose fibers and/or polyamide fibers.

According to the present invention, there is still further provided an ink-jet printing process comprising applying an ink to a cloth in accordance with an ink-jet system, subjecting the cloth to a reactively fixing treatment and then washing the cloth thus treated to remove an unreacted dye, wherein the ink comprises at least a reactive dye, a polyhydric alcohol and water and contains a reaction product of the reactive dye with the polyhydric alcohol in an amount of 1% to 50% by weight based on the weight of the reactive dye, and the cloth comprises cellulose fibers and/or polyamide fibers.

According to the present invention, there is yet still further provided an ink-jet printing unit comprising an ink container portion with an ink held therein and a head from which the ink is ejected in the form of ink droplets, wherein said ink is any one of the inks described above.

According to the present invention, there is yet still further provided an ink cartridge comprising an ink container portion with an ink held therein, wherein said ink is any one of the inks described above.

According to the present invention, there is yet still further provided an ink-jet printing apparatus comprising a printing unit equipped with an ink container portion with an ink held therein and a head from which the ink is ejected in the form of ink droplets, wherein said ink is any one of the inks described above.

According to the present invention, there is yet still further provided an ink-jet printing apparatus comprising an ink cartridge having an ink container portion with an ink held therein, and a printing head from which the ink is ejected in the form of ink droplets, wherein said ink is any one of the inks described above.

According to the present invention, there is yet still further provided a cloth printed by any one of the ink-jet printing processes described above.

According to the present invention, there is yet still further provided a processed article obtained by further processing the cloth described above.

DESCRIPTION OF THE PREFERRED EMBODIMENTS

Figure 1:
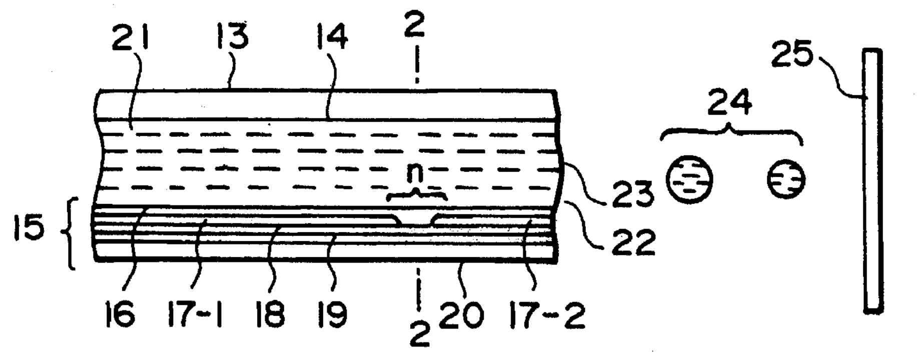
FIG. 1 is a longitudinal cross-sectional view of a nozzle of a head of an ink-jet printing apparatus.

The present inventors have found that when a hydrolyzate of a reactive dye or a reaction product of a reactive dye with a polyhydric alcohol is contained within an extremely limited range in an ink comprising the reactive dye, the unnecessary aggregation of molecules of the reactive dye in an aqueous liquid medium is prevented, and the dissolved state of the dye in the liquid medium is hence notably stabilized, and besides the efficiency of the monomolecular reaction of the dye with fibers is enhanced. This effect makes it possible to stably conduct dyeing at high concentration, to improve storage stability and to conduct textile printing with high reliability even when thermal energy is used to eject the ink. In particular, in the case where a head making good use of thermal energy is used, no deposition of foreign matter occurs on a heater serving to apply the thermal energy, cavitation upon the vanishing of bubbles is lightened, so disconnection is prevented, and frequency responsibility is improved. The present inventors have further found that such a constitution makes it possible to stabilize ejection properties for a long period of time and to prevent changes in ejection properties and dyeing properties even when stored for a long period of time. In particular, these effects are remarkable upon storage at a low temperature.

In the prior art, it has been considered that since these hydrolyzates of reactive dyes cannot form a covalent bond with fibers, its effect is not exhibited, in particular, from the viewpoint of dyeing. Therefore, textile printing has been conducted in such a manner that such a compound is not substantially contained by pH adjustment or the like.

In the present invention, it is important to add the hydrolyzate or reaction product within the limited range. If the amount of such a compound is too great, problems of reduction in color yield and staining on white portions are caused. If the amount is too small on the contrary, the effects of the present invention cannot be brought about.

With respect to the reactive dye useful in the practice of the present invention, those having a vinylsulfone group and/or a monochlorotriazine group are particularly preferred. The reason why the preferred reactive groups are specified is that the two reactive groups described above are excellent in strength of reactivity from the viewpoint of balance taking an ink-jet recording system into consideration. For example, a dichlorotriazine group high in reactivity tends to be hard to achieve the effects of the present invention, while a trichloropyrimidine group low in reactivity tends to fail to markedly exhibit the effects of the present invention.

Specific examples of such dyes include C.I. Reactive Yellow 2, 15, 37, 42, 76 and 95, C.I. Reactive Red 21, 22, 24, 31, 33, 45, 58, 111, 112, 114, 180, 218 and 226, C.I. Reactive Blue 15, 19, 21, 38, 49, 72, 77, 176, 203 and 220, C.I. Reactive Orange 5, 12, 13 and 35, C.I. Reactive Brown 7, 11, 33 and 46, C.I. Reactive Green 8 and 19, C.I. Reactive Violet 2, 6 and 22, C.I. Reactive Black 5, 8, 31 and 39, and the like, to which, however, are not limited. These dyes may be contained in an ink either singly or in any combination with dyes of the same or different hues.

The content of the dyes is generally within a range of from 2% to 30% by weight, preferably from 3% to 25% by weight, more preferably from 5% to 20% by weight based on the total weight of the ink. Amounts less than 2% by weight tend to result in an ink insufficient in color depth. On the other hand, amounts exceeding 30 % by weight tend to result in an ink insufficient in ejection properties.

The ink according to the present invention further contains a hydrolyzate of the reactive dye or a reaction product of the reactive dye with a polyhydric alcohol if the ink contains the polyhydric alcohol.

No particular limitation is imposed on the synthetic process of the hydrolyzate of the reactive dye, and any known process may hence be used. Such a hydrolyzate can be obtained with ease, for example, by adding an alkali metal to an aqueous solution of the reactive dye and stirring the mixture at 40° C. for about 2 hours.

No particular limitation is also imposed on the synthetic process of the reaction product of the reactive dye with the polyhydric alcohol. Such a product can be obtained, for example, by adding the polyhydric alcohol in an amount about 3 times of the weight of the dye to the dye and stirring the mixture together with an alkali metal at 60° C. for about 5 hours.

These hydrolyzate and reaction product are preferably purified by treating them by one of means such as recrystallization, salting out, column chromatography, solvent suspension cleaning, and solvent extraction, or any combination thereof. The content of these hydrolyzate and reaction product is within a range of from 1% to 50% by weight, preferably from 2 to 45% by weight, more preferably from 3 to 40% by weight based on the reactive dye contained in the ink. Besides, the total amount of the reactive dye and the hydrolyzate of the reactive dye or the reaction product of the reactive dye with the polyhydric alcohol is desirably within a range of from 2% to 30 % by weight, preferably from 3% to 25% by weight, more preferably from 4 to 20% by weight based on the total weight of the ink.

The content of water which is an essential component of the liquid medium for the inks according to the present invention is generally within a range of from 30% to 95% by weight, preferably from 40% to 90% by weight, more preferably from 50% to 85% by weight based on the total weight of the ink.

If the polyhydric alcohol is contained in the ink according to the present invention, any compound may be used so long as it has 2 or more hydroxyl groups in its molecule. Specific examples thereof include addition polymers of oxyethylene or oxypropylene such as diethylene glycol, triethylene glycol, tetraethylene glycol, dipropylene glycol, tripropylene glycol, polyethylene glycol, polypropylene glycol and the like; alkylene glycols the alkylene moiety of which has 2 to 6 carbon atoms, such as ethylene glycol, propylene glycol, trimethylene glycol, butylene glycol and hexylene glycol; triols such as 1,2,6-hexanetriol and glycerol; thiodiglycol; and the like.

Although the principal components of the inks according to the present invention are as described above, various kinds of solvents routinely used may also be used in combination with a view toward improving penetrability and preventing clogging in a short period of time. Specific examples thereof include ketones and ketoalcohols such as acetone and diacetone alcohol; ethers such as tetrahydrofuran and dioxane; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 1,3-dimethyl-2-imidazolidinone; and the like. The content of the organic solvent is generally within a range of from 1% to 40% by weight, preferably from 2% to 30 % by weight based on the total weight of the ink.

To the inks according to the present invention, may also be added various kinds of dispersants, surfactants, viscosity modifiers, surface tension modifiers, optical whitening agents and the like as needed. Specific examples thereof include viscosity modifiers such as polyvinyl alcohol and water-soluble resins; various kinds of anionic or nonionic surfactants; surface tension modifiers such as diethanolamine and triethanolamine; pH adjustors including alkali metals; mildewproofing agents; and the like.

When the textile printing ink according to the present invention is used to conduct textile printing on a cloth comprising principally cellulose fibers and/or polyamide fibers according to the ink-jet system, good results can be achieved. The cloth comprises principally cellulose fibers and/or polyamide fibers and preferably contains at least an alkaline substance. No particular limitation is imposed on the production process for such a cloth. However, the cloths described in Japanese Patent Application Laid-Open No. 63-168382, Japanese Patent Publication No. 3-46589, etc. may be used.

Viewed from physical features of fibers and yarn making up a cloth, those long in fiber length, thin in thickness of the yarn and fibers and great in number of twist are preferred. For example, a cloth formed from fibers having an average length of 25 mm to 60 mm, an average thickness of 0.6 to 2.2 deniers and an average number of twist of 70/cm to 150/cm is preferred in the case of the cloth composed mainly of cellulose fibers, and a cloth formed from silk yarn having an average thickness of 14 to 147 deniers composed of fibers having an average thickness of 2.5 to 3.5 deniers in the case of cloth composed mainly of silk fibers as polyamide fibers.

The cloths used in the present invention may be subjected to any pretreatment routinely used, as needed. In particular, cloths containing 0.01% to 5% by weight of at least one alkaline substance or 0.01% to 20% by weight of at least one substance selected from the group consisting of water-soluble metal salts, water-soluble polymers, urea and thiourea may preferably be used in some cases.

Examples of the alkaline substance used in the present invention include alkali metal hydroxides such as sodium hydroxide and potassium hydroxide, amines such as mono-, di- and triethanolamines, alkali metal carbonates and bicarbonates such as sodium carbonate, potassium carbonate and sodium bicarbonate, etc. Metal salts of organic acids such as calcium acetate and barium acetate, ammonia and ammonium compounds may also be included. Further, sodium trichloroacetate and the like, which form an alkaline substance by steaming or under dry heat, may also be used. Sodium carbonate and sodium bicarbonate, which are used in dyeing of reactive dyes, are particularly preferred alkaline substances.

As the water-soluble polymer, may be used either of a natural polymer and a synthetic polymer. Examples of the natural polymer include starches from corn, wheat and the like; cellulosics such as carboxymethyl cellulose, methyl cellulose and hydroxyethyl cellulose; polysaccharides such as sodium alginate, gum arabic, locust bean gum, tragacanth gum, guar gum and tamarind seed; proteins such as gelatin and casein; tannin and derivatives thereof; lignin and derivatives thereof; and the like. Examples of the synthetic polymer include polyvinyl alcohol type compounds, polyethylene oxide type compounds, water-soluble acrylic polymers, water-soluble maleic anhydride polymers and the like. Of these, the polysaccharide polymers and cellulosic polymers are preferred.

Examples of the water-soluble metal salts include compounds such as halides of alkali metals and alkaline earth metals, which form typical ionic crystals and have a pH of 4 to 10. Representative examples of such compounds include NaCl, $Na_2SO_4$, KCl and $CH_3COONa$ for alkali metals, and $CaCl_2$ and $MgCl_2$ for alkaline earth metals. Of these, salts of Na, K and Ca are preferred.

Further, the water content of the cloth also greatly affects textile printing. The water content of the cloth may preferably be adjusted to a 5 to 100 percent raise, more preferably a 6 to 80 percent raise of the official moisture regain (cellulose fiber: 8.5%, silk fiber: 12%). A process in which a cloth is immersed in purified water or an aqueous solution of a pretreating agent and then squeezed by rollers, and optionally dried is generally used as a method of adjusting the water content, to which, however, is not limited. The water content is determined in accordance with the following equation:

$$\text{Water content (\%)}=\{(W-W')/W''\}\times 100$$

wherein W is a weight of a sample before drying, W' is a weight of the sample after drying, and W" is a weight of the sample after water washing and drying.

The ink-jet printing process according to the present invention is a process in which the textile printing ink according to the present invention is applied to the cloth comprising cellulose fibers and/or polyamide fibers by an ink-jet recording system, and the cloth is then subjected to a dyeing treatment. As a preferred example of the ink-jet recording system used in the process according to the present invention, may be mentioned the method described in Japanese Patent Application Laid-Open No. 54-59936, i.e., a system in which thermal energy is applied to an ink so as to undergo rapid volume change, and the ink is ejected from a nozzle by action force caused by this change of state. The use of the inks according to the present invention in such a system permits stable textile printing without causing deposition of foreign matter on a heating head and disconnection even if printing is conducted continuously for a long period of time.

As an illustrative example of an apparatus, which is suitable for use in conducting textile printing using the inks according to the present invention, may be mentioned an apparatus in which thermal energy corresponding to recording signals is applied to an ink within a printing head, and ink droplets are generated by the thermal energy.

Figure 2:
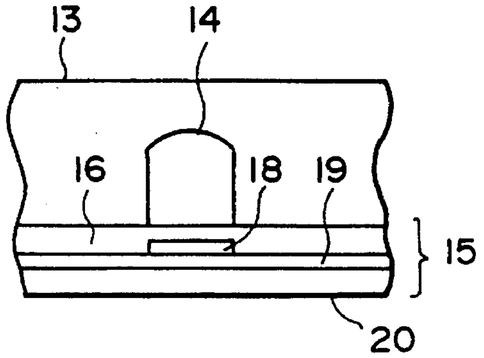
FIG. 2 is a transverse cross-sectional view of the nozzle of the head of the ink-jet printing apparatus.
Figure 3:
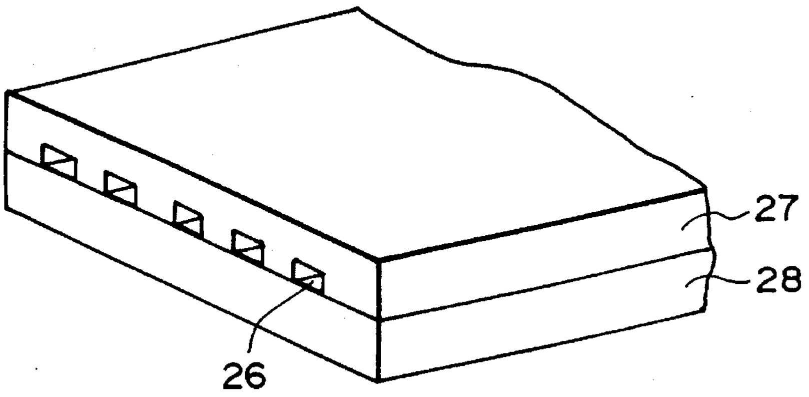
FIG. 3 is a perspective view of the appearance of a multi-nozzle head which is an array of such nozzles as shown in FIG. 1.

Examples of the construction of an head, which is a main component of such an apparatus, are illustrated in FIGS. 1, 2 and 3.

FIG. 1 is a cross-sectional view of nozzle of a head taken along a flow path of ink, and FIG. 2 is a cross-sectional view taken along line 2—2 of FIG. 1. A head 13 is formed by bonding a glass, ceramic or plastic plate or the like having a groove 14 through which ink is passed, to a heating layer 15 used in thermal recording (the drawing shows a layer, to which, however, is not limited). The heating layer 15 is composed of a protective film 16 formed of silicon oxide or the like, aluminum electrodes 17-1 and 17-2, a heating resistor layer 18 formed of nichrome or the like, a heat accumulating layer 19, and a substrate 20 made of alumina or the like having a good heat radiating property.

An ink 21 comes up to an ejection orifice 22 (a minute opening) and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a cloth 25 comprising cellulose fibers and/or polyamide fibers in the form of printing droplets 24. FIG. 3 illustrates an appearance of a multi-nozzle head composed of an array of a number of nozzles as shown in FIG. 1. The multi-nozzle head is formed by closely bonding a glass plate 27 having a number of grooves 26 to a heating layer 28 similar to the layer illustrated in FIG. 1.

Figure 4:
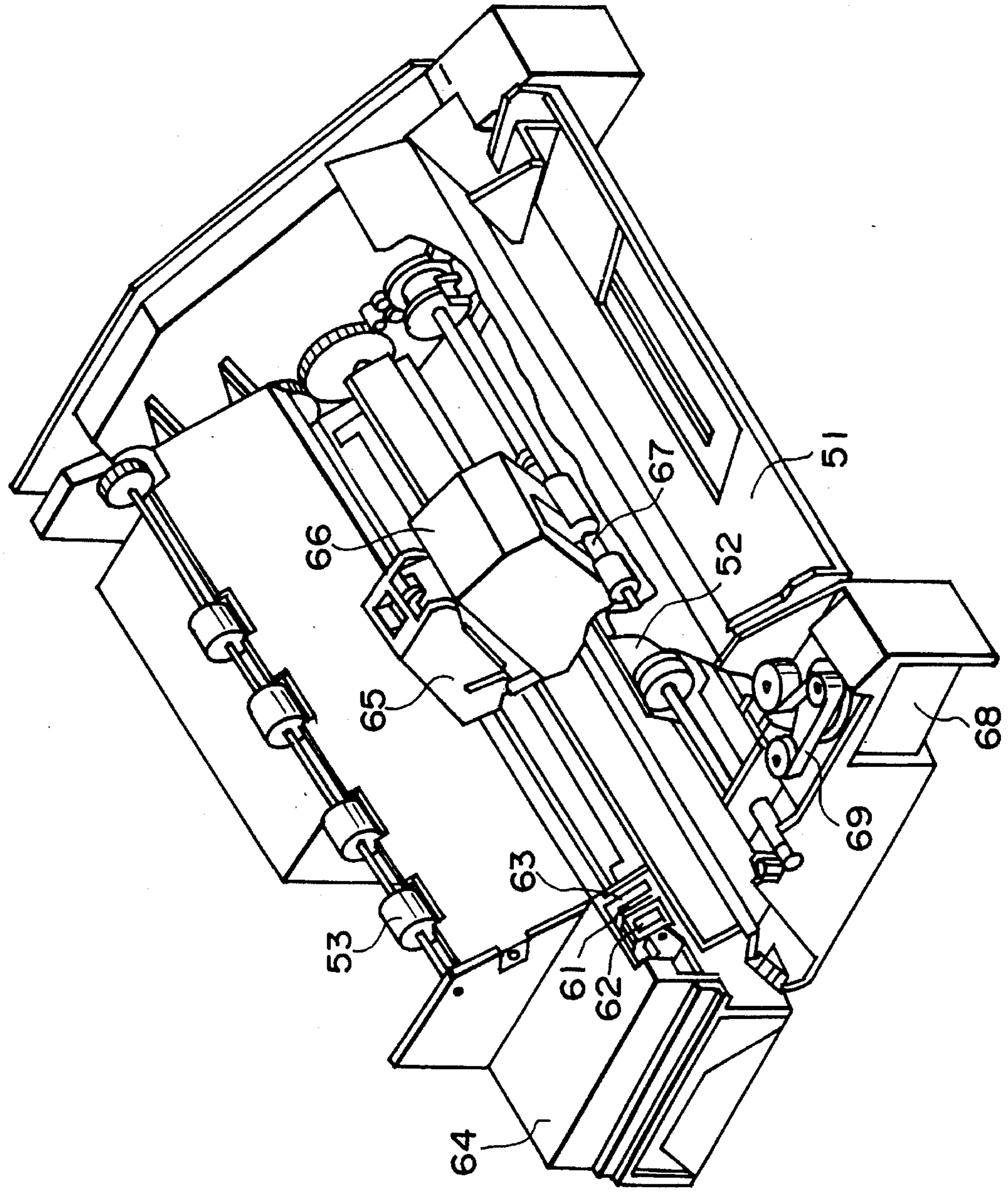
FIG. 4 is a perspective view of an illustrative ink-jet printing apparatus.

FIG. 4 illustrates an example of an ink-jet printing apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a printing head operates, and in this embodiment, is held in such a form that it protrudes to the course through which the printing head is moved. Reference numeral 62 indicates a cap, which is provided at the home position adjacent to the blade 61, and is so constituted that it moves in the direction perpendicular to the direction in which the printing head is moved and comes into contact with the face of ejection openings to cap it. Reference numeral 63 denotes an absorbing member provided adjoiningly to the blade 61 and, similar to the blade 61, held in such a form that it protrudes to the course through which the printing head is moved. The above-described blade 61, cap 62 and absorbing member 63 constitute an ejection-recovery portion 64 for the printing head, where the blade 61 and absorbing member 63 remove water, dust and/or the like from the face of the ink-ejecting openings.

Reference numeral 65 designates the printing head having an ejection-energy-generating means and serving to eject the ink onto the cloth set in an opposing relation with the ejection opening face provided with ejection openings to conduct textile printing. Reference numeral 66 indicates a carriage on which the printing head 65 is mounted so that the printing head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the printing head 65 can be moved from a printing region to a region adjacent thereto.

Reference numerals 51 and 52 denote a cloth feeding part from which the cloths are separately inserted, and cloth feed rollers driven by a motor (not illustrated), respectively. With such construction, the cloth is fed to the position opposite to the ejection opening face of the printing head, and discharged from a cloth discharge section provided with cloth discharge rollers 53 with the progress of printing.

In the above constitution, the cap 62 in the head recovery portion 64 is receded from the moving course of the printing head 65 when the printing head 65 is returned to its home position, for example, after completion of textile printing, and the blade 61 remains protruded to the moving course. As a result, the ejection opening face of the printing head 65 is wiped. When the cap 62 comes into contact with the ejection opening face of the printing head 65 to cap it, the cap 62 is moved so as to protrude to the moving course of the printing head.

When the printing head 65 is moved from its home position to the position at which textile printing is started, the cap 62 and the blade 61 are at the same positions as the positions upon the wiping as described above. As a result, the ejection opening face of the printing head 65 is also wiped at the time of this movement.

The above movement of the printing head to its home position is made not only when the textile printing is completed or the printing head is recovered for ejection, but also when the printing head is moved between printing regions for the purpose of textile printing, during which it is moved to the home position adjacent to each printing region at given intervals, where the ejection opening face is wiped in accordance with this movement.

Figure 5:
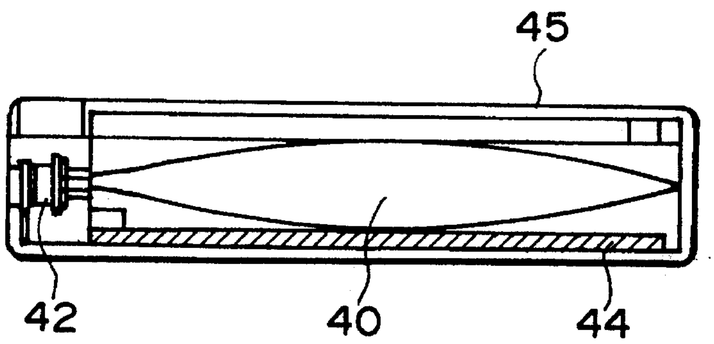
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. In this invention, it is preferable that the ink container portion be formed of a polyolefin, in particular, polyethylene, at its surface with which the ink comes into contact. A device in which these members are integrally formed may also be preferably used.

Figure 6:
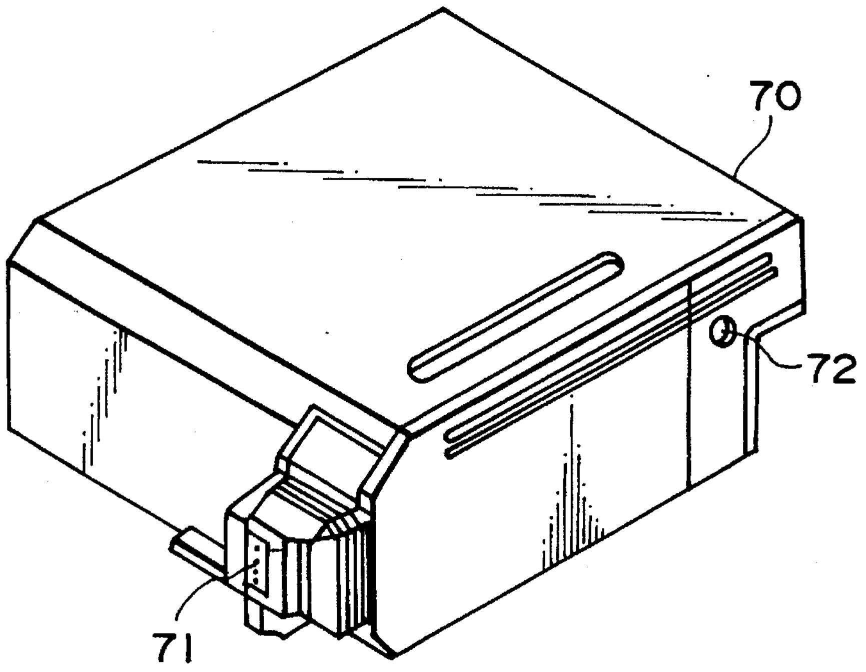
FIG. 6 is a perspective view of a printing unit.

In FIG. 6, reference numeral 70 designates a printing unit, in the interior of which an ink container portion containing an ink, for example, an ink-absorbing member, is contained. The printing unit 70 is so constructed that the ink in such an ink-absorbing member is ejected in the form of ink droplets through a head 71 having a plurality of orifices. In the present invention, polyurethane is preferably used as a material for the ink-absorbing member. Reference numeral 72 indicates an air passage for communicating the interior of the printing unit with the atmosphere. This printing unit 70 can be used in place of the printing head shown in FIG. 4, and is detachably installed on the carriage 66.

As conditions under which textile printing particularly high in effect can be carried out with the inks according to the present invention, it is preferred that an ejected ink droplet be within a range of from 20 pl to 200 pl, a shot-in ink quantity be within a range of from 4 to 40 $nl/mm^2$, a drive frequency be at least 1.5 kHz, and a head temperature be within a range of from 35° to 60° C.

The printing textile ink according to the present invention is applied onto a cloth in the above-described manner. However, the ink only adheres to the cloth in this state. Accordingly, the cloth must be subsequently subjected to a process for reactively fixing the dye in the ink to the fibers and a process for removing an unreacted dye. Such reactive fixing and removal of the unreacted dye may be conducted in accordance with methods known per se in the art. For example, the printed cloth is treated by a steaming process, an HT steaming process or a thermofix process, or in the case where no alkali-treated cloth is used, an alkaline pad-steam process, an alkaline blotch-steam process, an alkaline shock process or an alkaline cold fix process. In particular, the steaming process and the HT steaming process are preferred because the effects of the present invention can be more enhanced. Subsequent washing may be conducted in accordance with a method known per se in the art.

The cloth subjected to the above-described treatments is then cut into desired sizes, and the cut pieces are subjected to processes required to obtain final processed articles, such as sewing, bonding and/or welding, thereby obtaining apparel such as one-piecers, dresses, neckties or bathing suits, bed covers, sofa covers, handkerchiefs, curtains, or the like. Methods in which a cloth is processed by sewing and/or the like to obtain apparel or other daily needs are described in many known books, for example, "Saishin Nitto Hosei Manual (The Newest Knitting and Sewing Manual)", published by Seni Journal Co.; a monthly magazine, "Soen" published by Bunka Shuppan Kyoku; etc.

EXAMPLES

The present invention will hereinafter be described more specifically by the following Preparation Examples, Examples and Comparative Examples. Incidentally, all designations of "part" or "parts" and "%" as will be used in the following examples mean part or parts by weight and % by weight unless expressly noted.

Preparation Example 1

Preparation of hydrolyzate of dye

To 2 parts of C.I. Reactive Red 226 as a reactive dye, were added 400 parts of distilled water, and the resultant mixture was stirred at 30° C. until the dye was evenly dissolved in the water. Then, 1 part of sodium hydroxide was dissolved in 100 parts of distilled water, and the resultant solution was added to the aqueous solution of the dye previously prepared to stir the resultant mixture at 40° C. for 2 hours. Thereafter, a saturated solution of sodium acetate was added to the reaction mixture to conduct salting out. The resulting precipitate was collected by filtration and washed with ethanol. This process was repeated several times to remove sodium chloride secondarily produced in the hydrolytic reaction, thereby obtaining a hydrolyzate (a) of the dye.

Preparation Example 2

Preparation of hydrolyzate of dye

A hydrolyzate (b) of a dye was obtained in the same manner as in Preparation Example 1 except that C.I. Reactive Yellow 2 was used as a reactive dye.

Preparation Example 3

Preparation of hydrolyzate of dye

A hydrolyzate (c) of a dye was obtained in the same manner as in Preparation Example 1 except that C.I. Reactive Blue 15 was used as a reactive dye.

Preparation Example 4

Preparation of reaction product of dye with polyhydric alcohol

To 1 part of C.I. Reactive Blue 49 as a reactive dye, were added 3 parts of diethylene glycol as a polyhydric alcohol, and the resultant mixture was stirred under heat at 60° C. Upon elapsed time of 30 minutes after the generation of heat of reaction stopped, 5 parts of potassium hydroxide were added to the reaction mixture, followed by heating further for 5 hours. After removing undissolved matter by a centrifugal separator, unreacted diethylene glycol was extracted with methyl ethyl ketone, and solid matter was separated by filtration, thereby obtaining a reaction product (d) of the dye with the polyhydric alcohol.

Preparation Example 5

Preparation of reaction product of dye with polyhydric alcohol

A reaction product (e) of a dye with a polyhydric alcohol was obtained in the same manner as in Preparation Example 4 except that C.I. Reactive Orange 5 was used as a reactive dye.

Example 1

| | |
|---|---|
| Reactive dye (C.I. Reactive Red 226) | 10 parts |
| Hydrolyzate (a) obtained in Preparation Example 1 | 0.3 part |
| Thiodiglycol | 15 parts |
| Diethylene glycol | 10 parts |
| Tetraethylene glycol dimethyl ether | 5 parts |
| Water | 59.7 parts. |

After all the above components were mixed and stirred for 2 hours, the resultant mixture was filtered through a "Fluoropore Filter FP-100" (trade name; product of Sumitomo Electric Industries, Ltd.), thereby obtaining an ink-jet textile printing ink (A) according to the present invention.

Example 2

| | |
|---|---|
| Reactive dye (C.I. Reactive Yellow 2) | 10 parts |
| Hydrolyzate (b) obtained in Preparation Example 2 | 0.4 part |
| Thiodiglycol | 20 parts |
| Diethylene glycol | 10 parts |
| Water | 59.6 parts. |

After all the above components were mixed and stirred for 2 hours, the resultant mixture was filtered through a "Fluoropore Filter FP-100" (trade name; product of Sumitomo Electric Industries, Ltd.), thereby obtaining an ink-jet textile printing ink (B) according to the present invention.

Example 3

| | |
|---|---|
| Reactive dye (C.I. Reactive Blue 15) | 13 parts |
| Hydrolyzate (c) obtained in Preparation Example 3 | 0.65 part |
| Thiodiglycol | 23 parts |
| Triethylene glycol monobutyl ether | 6 parts |
| Water | 57.35 parts. |

After all the above components were mixed and stirred for 2 hours, the resultant mixture was filtered through a "Fluoropore Filter FP-100" (trade name; product of Sumitomo Electric Industries, Ltd.), thereby obtaining an ink-jet textile printing ink (C) according to the present invention.

Example 4

| | |
|---|---|
| Reactive dye (C.I. Reactive Blue 49) | 15 parts |
| Reaction product (d) obtained in Preparation Example 4 | 0.45 part |
| Thiodiglycol | 16 parts |
| Diethylene glycol | 17 parts |
| Water | 51.55 parts. |

After all the above components were mixed and stirred for 2 hours, the resultant mixture was filtered through a "Fluoropore Filter FP-100" (trade name; product of Sumitomo Electric Industries, Ltd.), thereby obtaining an ink-jet textile printing ink (D) according to the present invention.

Example 5

| | |
|---|---|
| Reactive dye (C.I. Reactive Orange 5) | 10 parts |
| Reaction product (e) obtained in Preparation Example 5 | 0.4 part |
| Thiodiglycol | 16 parts |
| Diethylene glycol | 12 parts |
| Tripropylene glycol | 5 parts |
| Water | 56.6 parts. |

After all the above components were mixed and stirred for 2 hours, the resultant mixture was filtered through a "Fluoropore Filter FP-100" (trade name; product of Sumitomo Electric Industries, Ltd.), thereby obtaining an ink-jet textile printing ink (E) according to the present invention.

Comparative Example 1

| | |
|---|---|
| Reactive dye (C.I. Reactive Red 226) | 10 parts |
| Hydrolyzate (a) obtained in Preparation Example 1 | 0.05 part |
| Thiodiglycol | 15 parts |
| Diethylene glycol | 10 parts |
| Tetraethylene glycol dimethyl ether | 5 parts |
| Water | 59.95 parts. |

After all the above components were mixed and stirred for 2 hours, the resultant mixture was filtered through a "Fluoropore Filter FP-100" (trade name; product of Sumitomo Electric Industries, Ltd.), thereby obtaining a comparative ink-jet textile printing ink (F).

Comparative Example 2

| | |
|---|---|
| Reactive dye (C.I. Reactive Red 226) | 10 parts |
| Hydrolyzate (a) obtained in Preparation Example 1 | 5.1 parts |
| Thiodiglycol | 15 parts |
| Diethylene glycol | 10 parts |
| Tetraethylene glycol dimethyl ether | 5 parts |
| Water | 54.9 parts. |

After all the above components were mixed and stirred for 2 hours, the resultant mixture was filtered through a "Fluoropore Filter FP-100" (trade name; product of Sumitomo Electric Industries, Ltd.), thereby obtaining a comparative ink-jet textile printing ink (G).

Comparative Example 3

| | |
|---|---|
| Reactive dye (C.I. Reactive Red 226) | 10 parts |
| Thiodiglycol | 15 parts |
| Diethylene glycol | 10 parts |
| Tetraethylene glycol dimethyl ether | 5 parts |
| Water | 60 parts. |

After all the above components were mixed and stirred for 2 hours, the resultant mixture was filtered through a "Fluoropore Filter FP-100" (trade name; product of Sumitomo Electric Industries, Ltd.), thereby obtaining a comparative ink-jet textile printing ink (H).

Comparative Example 4

| | |
|---|---|
| Reactive dye (C.I. Reactive Blue 49) | 15 parts |
| Reaction product (d) obtained in Preparation Example 4 | 0.07 part |
| Thiodiglycol | 16 parts |
| Diethylene glycol | 17 parts |
| Water | 51.93 parts. |

After all the above components were mixed and stirred for 2 hours, the resultant mixture was filtered through a "Fluoropore Filter FP-100" (trade name; product of Sumitomo Electric Industries, Ltd.), thereby obtaining a comparative ink-jet textile printing ink (I).

Comparative Example 5

| | |
|---|---|
| Reactive dye (C.I. Reactive Blue 49) | 15 parts |
| Reaction product (d) obtained in Preparation Example 4 | 7.7 parts |
| Thiodiglycol | 16 parts |
| Diethylene glycol | 17 parts |
| Water | 44.3 parts. |

After all the above components were mixed and stirred for 2 hours, the resultant mixture was filtered through a "Fluoropore Filter FP-100" (trade name; product of Sumitomo Electric Industries, Ltd.), thereby obtaining a comparative ink-jet textile printing ink (J).

Application Example and Evaluation

Using the respective ink-jet textile printing inks (A through J) obtained in Examples 1 to 5 and Comparative Examples 1 to 5, continuous printing of $2\times10^8$ pulses by 10 nozzles was conducted by means of a head (number of nozzles: 256, ejected ink droplet: 20 pl to 40 pl) for a "Color Bubble Jet Copier PIXEL PRO" (trade name, manufactured by Canon Inc.) making good use of thermal energy to investigate whether clogging of nozzles, reduction in amount of ejected ink droplet and ejection speed, and the like occurred or not. Further, after English characters and numerals were continuously printed for 3 minutes using the same head as that used above, and the printing was then stopped, the head was left to stand for 7 days without capping the nozzles, and recovery operation was then conducted to determine the presence of clogging of the nozzles due to deposition of solid matter near the tip of each nozzle (each nozzle was heated to a temperature range of from 35° to 60° C. prior to its use).

Further, each of the ink-jet textile printing inks (A through J) in an amount of 100 ml was put into a glass bottle to store it for 7 days at 0° C., thereby investigating its storage stability. The evaluation results of these inks are shown in Table 1.

Furthermore, each of the ink-jet textile printing inks (A through J) obtained in Examples 1 to 5 and Comparative Examples 1 to 5 was charged in a "Color Bubble Jet Copier PIXEL PRO" (trade name, manufactured by Canon Inc.) to conduct printing on a 100% cotton sheet (plain weave fabric, 100% of Egyptian cotton, water content: 15%) and a 100% silk sheet (with 8 monme of habutae, water content: 18%) which were each pretreated with an alkali solution containing 5% sodium bicarbonate and 5% urea, and then raised to 30% and dried. Portions of the print samples thus obtained were separately fixed by steaming treatments for 6 minutes and 8 minutes at 102° C. Thereafter, these print samples were washed with a neutral detergent to evaluate the inks in coloring ability under varied treatment conditions for the print samples and level dyeing ability. The results are shown in Table 1 (each of the print samples was provided as a solid printed sample of 2×10 cm under conditions of a shot-in ink quantity of 16 nl/mm$^2$).

Specific standards for evaluation of these items are described below.

Ejection stability

Continuous printing of $2\times10^8$ pulses was conducted by 10 nozzles to determine number of nozzles which did not cause clogging, reduction in amount of ejected ink droplet and ejection speed, etc., whereby each ink was ranked in accordance with the following standard:

A: 10 nozzles;

B: 6 to 9 nozzles;

C: 5 nozzles or less.

Deposition on the tip of nozzle

After conducting continuous printing for 3 minutes, the head was left to stand for 7 days without capping the nozzles to observe the state of clogging of the nozzles due to deposition of solid matter near the tip of each nozzle, whereby each ink was ranked in accordance with the following standard:

A: No clogging occurred;

B: Clogging occurred, but was recovered by suction;

C: Clogging was not recovered by suction.

Storage stability

After storing each ink in a glass bottle for 7 days at 0° C., whether foreign matter generated in the glass bottle or not was observed by naked eyes, whereby each ink was ranked in accordance with the following standard:

A: No foreign matter generated;

B: Foreign matter generated a little;

C: Foreign matter greatly generated.

Coloring ability, level dyeing ability

With respect to coloring ability, the following K/S value, which is a function of transmittance at a maximum absorption wavelength, was determined as to the print samples obtained by subjecting to the steaming treatments for 6 minutes and 8 minutes, respectively, thereby calculating their remainder to rank each ink in accordance with the following standard:

$K/S=(1-r)^2/2\times r$ ($r$: reflectance at a maximum absorption wavelength)

A: The remainder of K/S values was smaller than 1, which meant that the coloring ability does not vary depending upon the heating conditions;

B: The remainder of K/S values was 1 to 2, which meant that the coloring ability somewhat varies depending upon the heating conditions;

C: The remainder of K/S values was greater than 2, which meant that the coloring ability considerably varies depending upon the heating conditions.

With respect to level dyeing ability, each print sample was observed by naked eyes to evaluate the ink by the degree of unevenness, thereby ranking it in accordance with the following standard:

A: The print sample was even;

C: Unevenness was observed;

Incidentally, both coloring ability and level dyeing ability in textile printing were evaluated on the cotton sheet (100%)

and the silk sheet (100%) to show the evaluation results in the column of (coloring ability/level dyeing ability) in Table 1.

TABLE 1

| | | | | Coloring ability/ level dyeing ability | |
|---|---|---|---|---|---|
| | Ejection stability | Deposition on the tip | Storage stability | Cotton 100% | Silk 100% |
| Ex. 1 | A | A | A | A/A | A/A |
| Ex. 2 | A | A | A | A/A | A/A |
| Ex. 3 | A | A | A | A/A | A/A |
| Ex. 4 | A | A | A | A/A | A/A |
| Ex. 5 | A | A | A | A/A | A/A |
| Comp. Ex. 1 | B | B | C | C/C | B/C |
| Comp. Ex. 2 | C | C | B | C/C | C/C |
| Comp. Ex. 3 | B | B | C | C/C | B/C |
| Comp. Ex. 4 | B | B | C | B/C | B/C |
| Comp. Ex. 5 | C | C | B | C/C | C/C |

As apparent from the results shown in Table 1, the inks according to Examples 1 to 5 were excellent in the various properties, while the inks according to Comparative Examples 1 to 5 were poor in the various properties because the amounts of the hydrolyzates or reaction product added were outside the range of the present invention.

According to the inks of the present invention, as described above, prints free of feathering, bright and high in color depth can be stably provided using cloths composed mainly of cellulose fibers and/or polyamide fibers. Besides, the inks according to the present invention are good in short-term and long-term stability, and their dyeing properties remain unchanged during storage at a low temperature.

According to the inks of the present invention, further, ink-jet printing of a type that an ink is ejected by the bubbling phenomenon of ink caused by thermal energy can be conducted with high reliability of ejection performance without causing clogging of nozzles of a head, and the like over a long period of time.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink-jet textile printing ink comprising at least a reactive dye and water, wherein the ink further contains a hydrolyzate of the reactive dye in an amount of 1% to 50% by weight based on the weight of the reactive dye.

2. An ink-jet textile printing ink comprising at least a reactive dye, a polyhydric alcohol and water, wherein the ink further contains a reaction product of the reactive dye with the polyhydric alcohol in an amount of 1% to 50% by weight based on the weight of the reactive dye.

3. An ink-jet printing process comprising applying an ink to a cloth in accordance with an ink-jet system, subjecting the cloth to a reactively fixing treatment and then washing the cloth thus treated to remove an unreacted dye, wherein the ink comprises at least a reactive dye and water and further contains a hydrolyzate of the reactive dye in an amount of 1% to 50% by weight based on the weight of the reactive dye, and the cloth comprises cellulose fibers, polyamide fibers or mixtures thereof.

4. An ink-jet printing process comprising applying an ink to a cloth in accordance with an ink-jet system, subjecting the cloth to a reactively fixing treatment and then washing the cloth thus treated to remove an unreacted dye, wherein the ink comprises at least a reactive dye, a polyhydric alcohol and water and further contains a reaction product of the reactive dye with the polyhydric alcohol in an amount of 1% to 50% by weight based on the weight of the reactive dye, and the cloth comprises cellulose fibers, polyamide fibers or mixtures thereof.

5. The ink-jet printing process according to claim 3 or 4, wherein the cloth is pretreated before the application of the ink.

6. The ink-jet printing process according to claim 3 or 4, wherein the ink-jet system is a system making use of thermal energy.

7. An ink-jet printing unit comprising an ink container portion with an ink held therein and a head from which the ink is ejected in the form of ink droplets, wherein said ink is the ink according to claim 1 or 2.

8. The printing unit according to claim 7, wherein the head comprises a head which causes thermal energy to act on the ink to eject its droplets.

9. An ink cartridge comprising an ink container portion with an ink held therein, wherein said ink is the ink according to claim 1 or 2.

10. An ink-jet printing apparatus comprising a printing unit equipped with an ink container portion with an ink held therein and a head from which the ink is ejected in the form of ink droplets, wherein said ink is the ink according to claim 1 or 2.

11. The ink-jet printing apparatus according to claim 10, wherein the head is a head which ejects ink droplets by applying thermal energy to the ink.

12. An ink-jet printing apparatus comprising an ink cartridge having an ink container portion with an ink held therein, and a printing head from which the ink is ejected in the form of ink droplets, wherein said ink is the ink according to claim 1 or 2.

13. The ink-jet printing apparatus according to claim 12, further comprising an ink feeder for feeding the ink held in the ink cartridge from the ink cartridge to the printing head.

14. The ink-jet printing apparatus according to claim 12, wherein the printing head comprises a head which ejects ink droplets by applying thermal energy to the ink.

15. A cloth printed by the ink-jet printing process according to claim 3 or 4.

16. A processed article obtained by further processing the printed cloth according to claim 15.

17. The processed article according to claim 16, which is obtained by cutting the printed cloth into desired sizes, and then subjecting each of the cut pieces to processes required to obtain a final processed article.

18. The processed article according to claim 17, wherein a process required to obtain the final processed article is sewing.

19. The processed article according to claim 16, wherein the processed article is apparel.

* * * * *